Oct. 6, 1942.                I. P. THUNELL                2,298,262
                                 TOY
                           Filed May 11, 1942
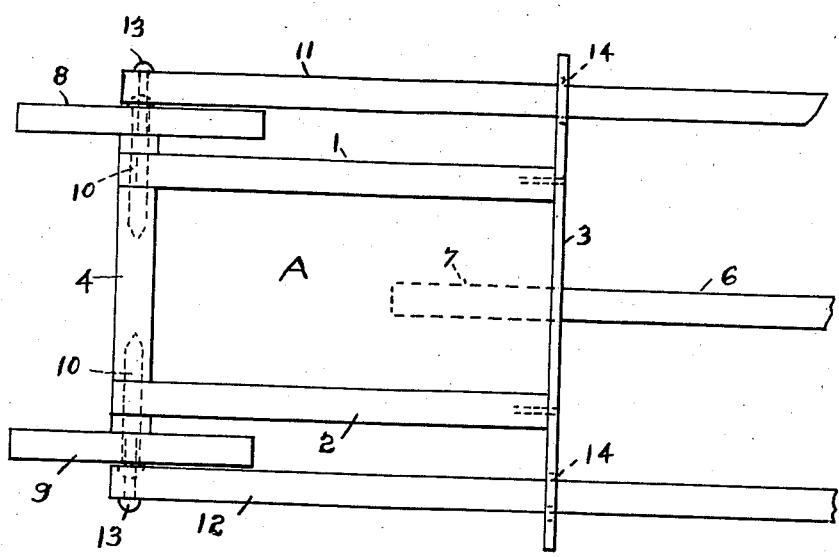
FIG 1
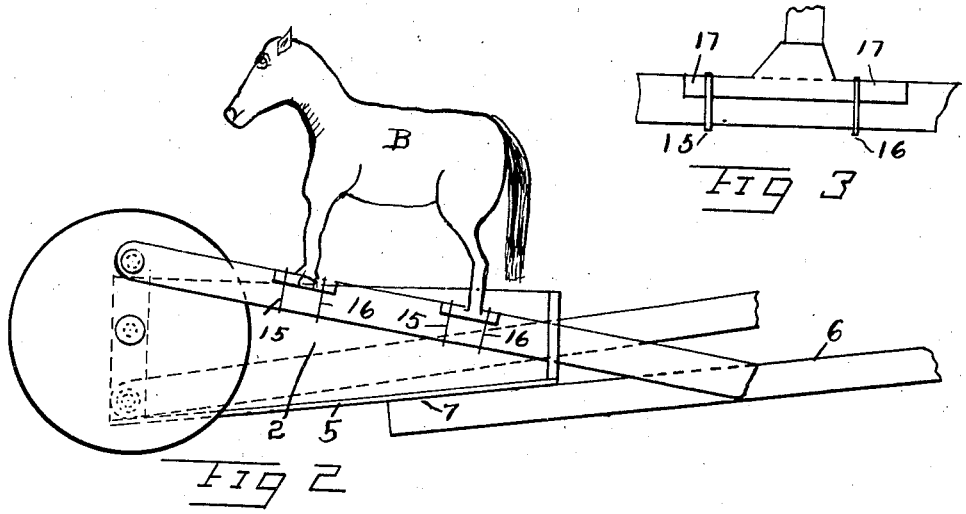
FIG 2
FIG 3
Isaac P. Thunell
   Inventor
By F. L. Horspool
   Attorney Patented Oct. 6, 1942

2,298,262

UNITED STATES PATENT OFFICE 2,298,262

TOY

Isaac P. Thunell, Holladay, Utah, assignor of one-half to J. Graydon Robinson and Fawn Ivins Robinson, Glasgow, Mont.

Application May 11, 1942, Serial No. 442,404

1 Claim. (Cl. 46—101)

This invention relates to an improvement in a toy for children and has for its object with interchangeable animals carried by a cart.

With this object in view, the invention consists of the novel construction and arrangements of its parts to be hereinafter described and claimed.

In the accompanying drawing forming a part of this specification and in which corresponding parts are denoted by like reference characters, is illustrated the preferred form of embodiment of the invention capable of carrying the same into practical operation, it being understood that the invention is not necessarily limited thereto, as various changes in shape, proportions and general assemblage of its parts may be resorted to without departing from the principles of the invention or sacrificing any of its advantages, and the right is therefor reserved to make all changes and modifications that will fairly fall within the scope of the invention and the claim made therefor.

Referring to the drawing:

Figure 1 is an assembled plan view of the cart.

Fig. 2 a side view of Fig. 1 showing an animal mounted thereon.

Fig. 3 is a fragmentary view showing the means of securing an animal to a rocking bar.

A denotes the body of the cart having side walls 1 and 2, and end walls 3 and 4, and a bottom 5. A handle 6 one end thereof is attached to the bottom 5 at 7 the other end being held by a child.

To the side walls are rotary placed wheels 8 and 9. The wheels 8 and 9 are held into place by pins or screws for an axle 10. To the wheel 8 is placed a rod 11 and to wheel 9 is placed another rod 12. The rods 11 and 12 are pivotally attached at one end to the wheels in an eccentric manner by a bolt or screw 13. The front end of each rod extends through an aperture 14 in the ends of the rear wall 3. Rubber bands 15 and 16 are placed on each rod before they are secured to the wheels.

The front wall 4 is deeper than the rear wall 3 which gives a tapering effect to the bottom 5, or in other words the front of the body A is deeper than the rear so that a child can set a doll into the cart.

Onto the rods 11 and 12 are placed animals of various kinds. In Fig. 2 a horse B is shown mounted on the rod 12 this may be taken off and any other kind of animal placed thereon. Many different kinds of animals are furnished with the cart.

In the operation of the invention, when the cart is moved the wheels will revolve which gives a forward, backward, up and down movement to the rods 11 and 12 which are attached to the wheels as they are moved through the apertures 14 in the front wall 3.

In securing the animals to the rods I use rubber bands 15 and 16 placed over the rods 11 and 12. The bands are placed over a projection 17, 17, on the bottom of an animal's foot, see Fig. 3. I may use other means in place of the rubber bands such as metal. All animals are made out of cardboard or metal and having the design of the animal painted thereon. The rods 11 and 12 and the handle 6 are shown broken off.

On the bottom of the animal's feet is a projection 17 over which rubber bands are placed to secure the animal to the rods 11 and 12.

Having thus described my invention what I claim as new and desire to secure by Letters Patent is:

A toy consisting of a cart having two side walls, a front wall and a rear wall, an axle projecting from each side wall near the front end of the cart, a wheel mounted for rotation upon each axle, an eccentric pin on each of the two wheels, rods having one end thereof pivotally attached to each of said eccentric pins and passing through openings formed in said rear wall, a handle for propelling said cart, whereby when the cart is moved said rods will be propelled by said eccentric pins acting as crank pins, and a figure mounted on said rods and partaking of the motion thereof.

ISAAC P. THUNELL.